Aug. 27, 1935.  C. D. STRONG  2,012,593
INSIDE LAMP FOR AUTOMOBILES
Filed May 29, 1934
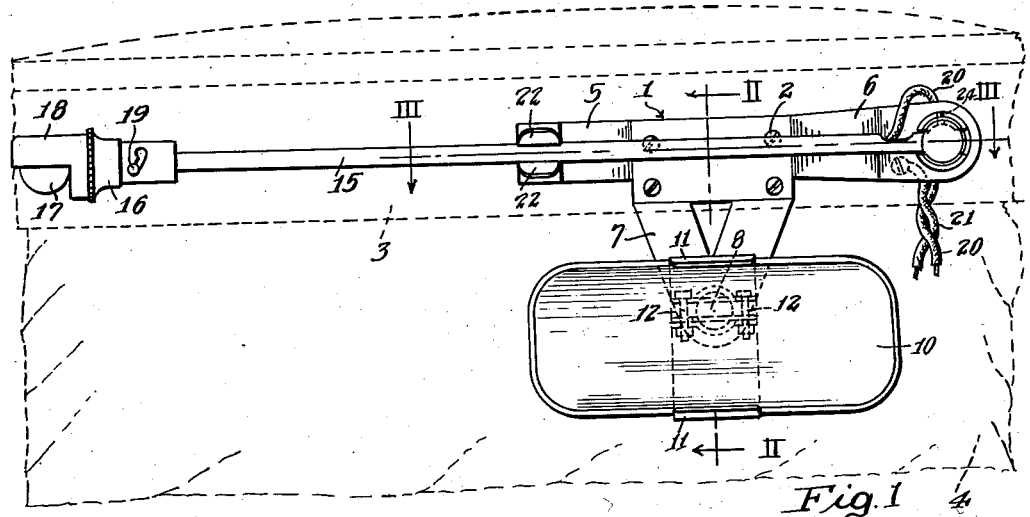
Fig. 1
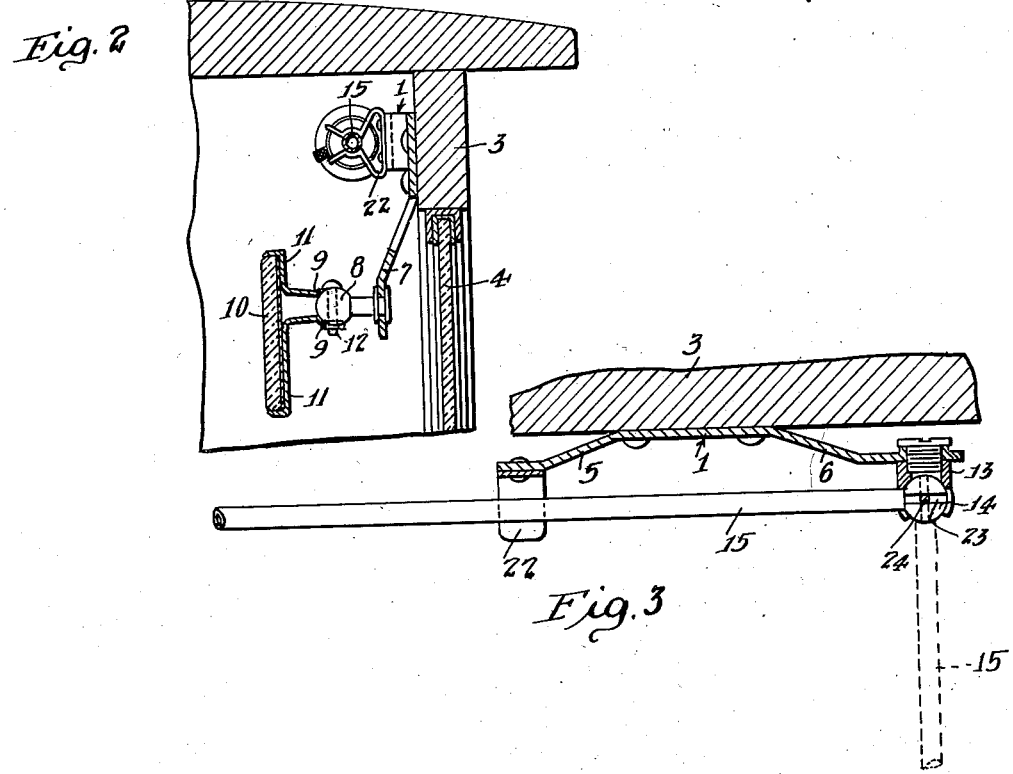
Fig. 2
Fig. 3
Inventor
Clarence D. Strong
By Lyon+Lyon
Attorneys Patented Aug. 27, 1935

2,012,593

UNITED STATES PATENT OFFICE 2,012,593

INSIDE LAMP FOR AUTOMOBILES

Clarence D. Strong, Los Angeles, Calif.

Application May 29, 1934, Serial No. 728,069

2 Claims. (Cl. 240—7.1)

This invention relates to lamp structures for providing illumination within a vehicle, such as an automobile.

An object of the invention is to provide a lamp and rear view mirror assembly for an automobile in which the lamp may be readily shifted into position to direct light on reading matter held by an occupant of the front seat or to direct light on the face of an occupant employing the rear view mirror as a make-up mirror, and in which the lamp may be shifted out of the way and held in out of the way position when not in use.

Further objects and features of the invention will appear from the following detailed description which refers to the drawing, in which Fig. 1 is an elevational view of a rear view mirror and lamp assembly in accordance with the invention, shown positioned in an automobile;

Fig. 2 is a vertical sectional view in the plane II—II of Fig. 1; and

Fig. 3 is a partial horizontal section taken in the plane III—III of Fig. 1.

Referring to the drawing, my lamp and rear view mirror assembly comprises a supporting or base plate 1 adapted to be secured as by screws 2 to that portion 3 of the frame of an automobile body positioned immediately above the windshield 4. The plate 1 is elongated at the top to form a leftwardly extending arm 5 and a rightwardly extending arm 6. Plate 1 is also provided with a downwardly and forwardly extended arm 7, on the lower extremity of which there is mounted a ball 8, which cooperates with a socket for pivotally supporting a rear view mirror 10. Thus the socket comprises a pair of cupped members 9 adapted to engage the ball 8 and having formed integrally therewith clamp arms 11, which engage the edges of the mirror 10. The cupped members 9 may be clamped against the ball 8 by a pair of bolts 12.

Mounted on the end of the rightwardly extended arm 6 is a socket 13 which frictionally engages a ball 14 secured to one end of a lamp arm 15. Lamp arm 15 is preferably about 15 inches in length and has attached thereto at its outer end a lamp socket 16 adapted to receive an electric lamp 17. The socket 16 is also preferably provided with a lamp shade 18 of the type commonly employed on automobile dash lamps, and with a switch 19 of conventional construction. Current is preferably conducted to the socket 16 by a conductor 20 extended through the hollow arm 15, the return circuit being completed through the arm itself. If the plate 1 is grounded to the metal framework of the car, then it is merely necessary to extend the wire 20 to the ungrounded terminal of the automobile battery. If the plate 1 is not grounded, then a separate wire 21 may be employed to connect the plate with the grounded side of the automobile battery.

To retain the lamp and its supporting arm in out of the way position when the lamp is not in use, a pair of spring clips 22 are provided on the end of the leftwardly extending arm 5, these clips being shaped to receive the arm 15, as clearly shown in Figs. 1 and 2 and in full line showing of Fig. 3. It will be observed that when the arm 15 is engaged between the clips 22, the arm and the lamp lie parallel to and closely adjacent the frame portion 3 of the automobile immediately above the windshield and out of the way.

When it is desired to employ the lamp, the arm 15 is simply swung out of engagement with the clips 22 into position substantially at right angles to the windshield, as shown in dotted lines in Fig. 3. Of course, the arm 15 may then be adjusted up or down or to the right or left as necessary to direct the light where it is most wanted.

It is found that the mounting of the lamp in the particular manner described makes it possible to direct the light therefrom on the face of a person employing the rear view mirror of the car as a make-up mirror without directing the light into the eyes. The lamp is also very useful for reading purposes, particularly when the driver of the automobile or his companion desire to consult road maps or the like, as the light is directed downwardly from a position above the heads of the occupants.

Although not essential, it is desirable to provide a slot 23 (Fig. 3) in the ball 14 and a cooperating pin 24 in the socket 13 to prevent rotation of the arm 15 about its own axis, thereby always maintaining the lamp in a position to direct light downwardly. It is also essential, of course, that there be sufficient friction between the ball 14 and socket 13 to retain the arm in whatever position it is moved to.

This invention is obviously susceptible to various modifications and is not to be limited to the specific details disclosed in the drawing but only as set forth in the appended claims.

I claim:

1. A combination rear view mirror and lamp for an automobile comprising a supporting plate adapted to be secured to an automobile body above the windshield thereof, said plate being relatively long at the top and having a downwardly extending arm, a mirror, means including a ball and socket hinge for movably supporting said mirror on said downwardly extending arm of said plate, a lamp, a lamp arm having said lamp secured thereto at one end, means including a ball and socket hinge for pivotally supporting the other end of said lamp arm from one end of said plate, and retaining means at the other end of said plate for releasably engaging said lamp arm when the latter is swung into position parallel to said plate.

2. A combination rear view mirror and lamp for an automobile comprising a supporting member adapted to be secured to an automobile body at a point above the windshield thereof, a mirror, means for pivotally supporting said mirror from said member, a lamp, a lamp arm having said lamp secured thereto at one end, means for hingedly supporting the other end of said lamp arm to said supporting member at a level above said mirror, whereby said lamp is free to swing in a horizontal arc above said mirror from a position above and to one side of said mirror into a position above and to the other side of said mirror, said supporting member being elongated at a level above said mirror and said lamp arm being pivotally attached to one edge of said elongated portion, with retaining means on the other end of said elongated portion of said member for releasably engaging and supporting said lamp arm when the latter is swung into position parallel with said member.

CLARENCE D. STRONG.